Jan. 5, 1926.
H. A. METCALF
EYESHADE
Original Filed July 28, 1922
1,568,900
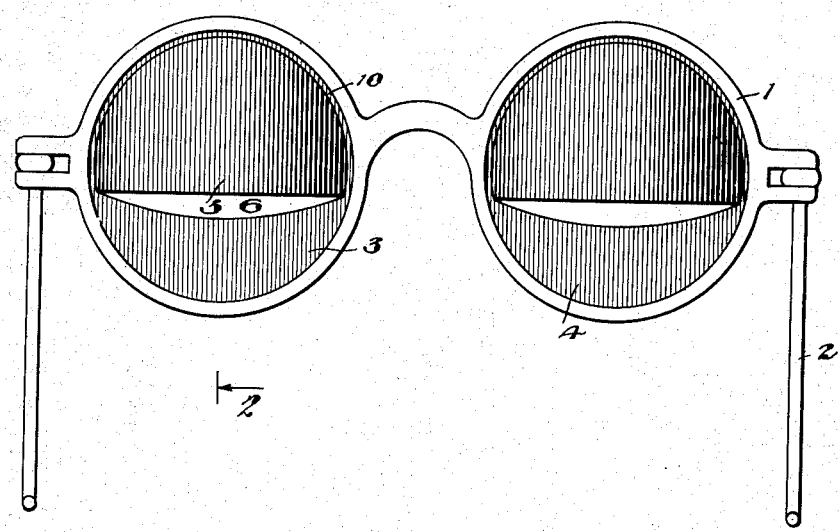
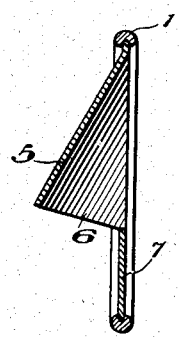
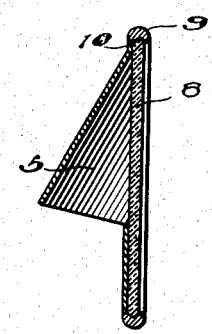
WITNESSES
INVENTOR
Herbert A. Metcalf
BY
ATTORNEYS Patented Jan. 5, 1926.

1,568,900

UNITED STATES PATENT OFFICE.

HERBERT A. METCALF, OF NEW YORK, N. Y.

EYESHADE.

Application filed July 28, 1922, Serial No. 578,124. Renewed November 12, 1924.

*To all whom it may concern:*

Be it known that I, HERBERT A. METCALF, a citizen of the United States. and a resident of the city of New York, borough of Manhattan, in the county and State of New York, have invented a new and Improved Eyeshade, of which the following is a full, clear, and exact description.

This invention relates to eye shades and has for an object to provide a construction which may be used alone or in connection with eye glasses and when in use will shield the eye against certain rays of the sun.

Another object of the invention is to provide an eye shade wherein means are presented which will shade the eye while openings are provided permitting the circulation of air and for permitting the eye to observe objects without looking through the shade.

In the accompanying drawing—

Figure 1 is a front view of an eye shade disclosing an embodiment of the invention.

Figure 2 is a sectional view through Figure 1 approximately on line 2—2.

Figure 3 is a sectional view similar to Figure 2 but showing a slightly modified construction.

Referring to the accompanying drawing by numerals, 1 indicates an eye glass frame of any desired construction provided with suitable bows 2 which may be looped over the ears when the device is in use in the ordinary manner of glasses. The frame 1 may be made of any desired material, as for instance, celluloid and instead of having the usual lenses arranged therein, shades 3 and 4 are provided which fit into the groove in the frame 1 in the usual manner of lenses. These shades are of identical construction so that the description of one will apply to both.

As indicated in Figure 2, the shade 3 is provided with a pressed out portion or section 5 which projects beyond the plane of the shade so as to provide an opening 6 shaped as a segment of a circle above the section 7 which is preferably flat and prevents the reflection from the ground from striking the eye while the portion 5 prevents the rays coming from above from striking the eye. The shade 3 may be made from any suitable material but preferably celluloid and is colored to suit the wishes of the person using the device, as for instance, green or amber.

When the shade is in use a person may look through the opening 6 and view an article or object or if preferred, the person using the shade may look directly through the portion 5 at any desired object. By arranging the parts as described, the direct rays from the sun or clouds and the reflected rays from the earth or objects below the eye will be caused to pass through the shade or become entirely eliminated thereby.

If desired, instead of making the entire shade 3 of celluloid as shown in Figures 1 and 2, the upper part of the shade could be secured to a lens 8 or to the frame 9 carrying the lens as indicated in Figure 3. The upper part of the shade 3 is formed with a flat annular section 10 merging into the portion 5, said flat annular section 10 being secured by adhesive or other means in place when used as shown in Figure 3. The eye shield is preferably made from a good quality of celluloid and arranged as shown in Figures 1 and 2 though under some circumstances it might be made as shown in Figure 3 or the arrangement shown in Figure 1 could be made of one integral piece pressed into the shape shown or some other convenient shape wherein the lenses and frames are of one piece.

What I claim is:—

1. An eye shade, comprising a spectacle frame having a pair of lens receiving rings, each of said rings having an interior annular groove and a disk of translucent celluloid fitted into each of said grooves, each of said disks being provided with a cut at the center shaped as a segment of a circle and extending from near one side to near the opposite side, the part above the cut being pressed outwardly to form a hood arc-shaped in cross section with the bottom thereof spaced an appreciable distance from the upper edge of the lower part of the disk the said lower part of the disk being flat.

2. An eye shade, comprising a spectacle frame having a pair of lens receiving rings and a disk of translucent celluloid connected with each of said rings, each of said disks being provided with a cut at the center shaped as a segment of a circle and extending from near one side to near the opposite side, the part above the cut being pressed outwardly to form a hood arc-shape in cross section with the bottom thereof spaced an appreciable distance from the upper edge of the lower part of the disk the said lower part being flat.

HERBERT A. METCALF.